A. ANIA.
AIRPLANE LANDING GEAR.
APPLICATION FILED SEPT. 11, 1918.
1,285,893.
Patented Nov. 26, 1918.
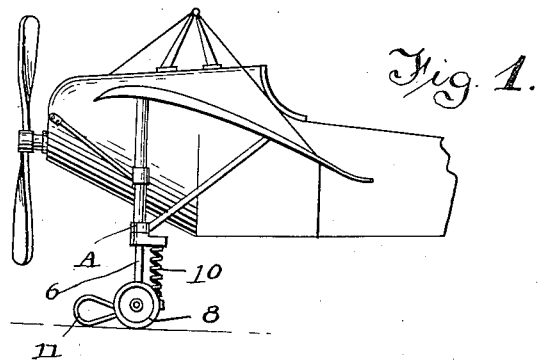
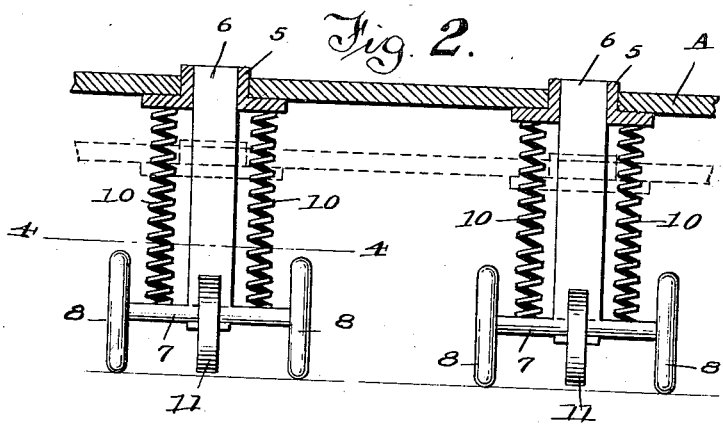
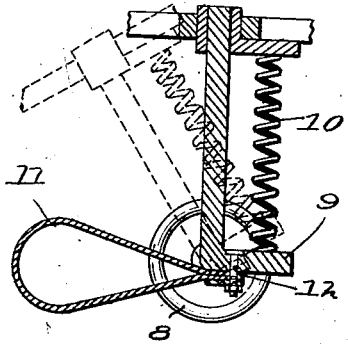
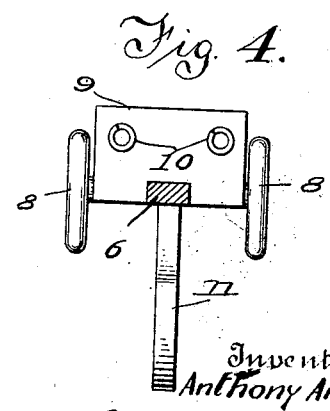
Inventor
Anthony Ania
By Victor J. Evans
Attorney

UNITED STATES PATENT OFFICE.

ANTHONY ANIA, OF CORONA, NEW YORK.

AIRPLANE LANDING-GEAR.

1,285,893.   Specification of Letters Patent.   Patented Nov. 26, 1918.

Application filed September 11, 1918. Serial No. 253,603.

*To all whom it may concern:*

Be it known that I, ANTHONY ANIA, a subject of the King of Italy, residing at Corona, in the county of Queens and State of New York, have invented new and useful Improvements in Airplane Landing-Gears, of which the following is a specification.

This invention relates to airplanes, particularly to landing gears therefor, and has for its object the provision of means for absorbing the shock of landing, the invention contemplating the provision of vertically sliding yieldable beams upon which the landing wheels are carried.

An important object is the provision of a device of this character in which the wheel carrying beams are provided with forwardly extending resilient skids engageable with the ground for restoring the airplane to its proper balance in the event that it tends to strike the ground at too great an angle, these skid members engaging the ground prior to engagement therewith by the wheels so as to prevent injury to the latter.

An additional object is the provision of a device of this character which will be comparatively simple and inexpensive in manufacture, and installation, efficient in use, durable in service and a general improvement in the art.

With the above and other objects and advantages in view, the invention consists in the details of construction to be hereinafter more fully described and claimed, and illustrated in the accompanying drawings in which:—

Figure 1 is a fragmentary side elevation of an airplane equipped with my device.

Fig. 2 is a vertical sectional view through the front portion thereof showing my device in front elevation.

Fig. 3 is a longitudinal sectional view taken at right angles to Fig. 2, and

Fig. 4 is a horizontal sectional view on the line 4—4 of Fig. 2.

Referring more particularly to the drawings the letter A designates a portion of the body of an airplane to which my device is applied. In carrying out my invention I provide upon the lower side of the body A a pair of guide sockets 5 which extend through the bottom of the body and within which are slidably arranged L-shaped beams 6 which extend below the bottom of the airplane and which carry the axles 7 upon which the landing wheels 8 are mounted. Disposed between the horizontal flanges 9 of the beam 6 and the undersides of the guide sockets 5 are springs 10 which are held in place by any suitable means.

When an airplane equipped with my device lands, engagement of the wheels 8 with the ground will cause the beams 6 to move upwardly through the socket members 5, the springs 10 becoming compressed and taking up the shock as will be readily apparent.

It frequently occurs that an airplane in landing approaches the ground at too great an angle, in which event there is great danger of damaging the wheels and their associated parts. In order to prevent such danger, I provide upon the beams 6 forwardly extending skid members 11 which are formed of spring steel bent into loop shape as shown. The ends of the members 11 are brought together as shown and bolted to the undersides of the horizontal flanges 9 of the beams 6 as shown at 12. In the event that an airplane thus equipped approaches the ground at too great an angle, the members 11 will engage the ground while the wheels 8 are still at a considerable distance above the ground and will tend to right the machine before the wheels touch. In view of the fact that the skid members 11 are formed of spring steel or other suitable material they may give sufficiently that they will not be injured by such contact. Furthermore, the fact that these skid members are resilient serves to cushion the shock of landing and prevent any injury to the parts.

From the foregoing description and a study of the drawing it will be apparent that I have thus provided a very simple and efficient device which will absorb the shock of landing and which will moreover serve to right the machine into a more nearly horizontal position before the landing wheels can engage upon the ground.

While I have shown and described the preferred embodiment of the invention, it will of course be readily understood that I reserve the right to make such changes in the form, construction and arrangement of parts as will not depart from the spirit of the invention nor the scope of the subjoined claims.

Having thus described my invention I claim:—

1. A device of the character described comprising a guide socket secured upon the underside of an airplane body, an L-shaped beam having its vertical leg slidable through said socket, springs interposed between the underside of said socket and the top of the horizontal flange of said beam, and wheels carried by said beam.

2. A device of the character described comprising a guide socket secured upon the underside of an airplane body, an L-shaped beam having its vertical leg slidable through said socket, a plurality of springs disposed between the underside of said socket and the upper side of the horizontal flange of said L-shaped beam, wheels carried by said beam, and a forwardly extending resilient skid secured upon the horizontal flange of said beam.

3. In combination with a wheel carrying beam of an airplane, a skid comprising a length of resilient metal bent into loop form and having its ends brought together and secured upon said beam, said skid member extending forwardly of said wheel.

In testimony whereof I affix my signature.

ANTHONY ANIA.